US009848597B1

United States Patent
Orr et al.

(10) Patent No.: US 9,848,597 B1
(45) Date of Patent: Dec. 26, 2017

(54) DEER HUNTING DECOY

(71) Applicant: Paula McWhorter, Port Deposit, MD (US)

(72) Inventors: Stephen A. Orr, Port Deposit, MD (US); W. Warren Basher, Hockessin, DE (US)

(73) Assignee: Stephen Orr, Port Deposit, MD (US)

( * ) Notice: Subject to any disclaimer, the term of this patent is extended or adjusted under 35 U.S.C. 154(b) by 140 days.

(21) Appl. No.: 14/924,010

(22) Filed: Oct. 27, 2015

(51) Int. Cl.
*A01M 31/06* (2006.01)
*A01M 31/00* (2006.01)

(52) U.S. Cl.
CPC .......... *A01M 31/06* (2013.01); *A01M 31/004* (2013.01)

(58) Field of Classification Search
CPC .................................................... A01M 31/06
USPC ........................................................... 43/2, 3
See application file for complete search history.

(56) References Cited

U.S. PATENT DOCUMENTS

| D325,617 | S |   | 4/1992  | Smith |                |
|----------|---|---|---------|-------|----------------|
| 5,459,958 | A | * | 10/1995 | Reinke | A01M 31/06 43/2 |
| 5,546,692 | A | * | 8/1996  | Byers | A01M 31/06 43/1 |
| 5,791,081 | A | * | 8/1998  | Turner | A01M 31/06 43/2 |
| 5,983,552 | A | * | 11/1999 | Nelson | A01M 31/06 43/2 |
| 6,021,594 | A | * | 2/2000  | Krueger | A01M 31/06 43/2 |
| 6,092,322 | A |   | 7/2000  | Samaras |              |
| 6,510,644 | B1 |  | 1/2003  | Golinik |              |
| 6,901,693 | B1 | * | 6/2005 | Crowe | A01M 31/06 43/2 |
| 7,441,365 | B2 |  | 10/2008 | Brunner et al. |     |
| 7,549,248 | B1 |  | 6/2009  | Luster |              |
| D624,145  | S  |  | 9/2010  | Gentle |              |
| 7,814,700 | B2 |  | 10/2010 | Groth  |              |
| D645,536  | S  | * | 9/2011  | Gentle | D22/125       |
| 2006/0064915 | A1 | * | 3/2006 | Cianciarulo | A01M 31/06 43/2 |
| 2007/0190891 | A1 | * | 8/2007 | McKinnon | A01M 31/06 446/72 |

(Continued)

*Primary Examiner* — Darren W Ark
*Assistant Examiner* — Brady W Frazier
(74) *Attorney, Agent, or Firm* — Rogowski Law LLC (57) ABSTRACT

A deer hunting decoy has a central post within a flexible cover having front and rear faces with coloration simulating the hind quarters of a deer, with each including a lighter colored central portion surrounded by a darker colored border. The lighter colored central portions are covered by tail flaps. The tail flaps are joined for rotational movement to an axle that extends across the central post and through holes in the flexible cover. A pull cord is directly or indirectly joined to the axle. Tugging the pull cord causes rotation of the axle and movement of the tail flaps to simulate tail movement of a deer. The central post is staked to a ground. Different decoy deer heads are interchangeably attachable. A buck head silhouette terminates in a tube connector that releasable fits within a proximal end of the central post. A grazing doe silhouette has a hook portion at one end and a doe head at the opposite end. The hook portion is inserted over an edge of an opening in the flexible cover and the head portion is pinned to the ground.

20 Claims, 10 Drawing Sheets

(56) References Cited

U.S. PATENT DOCUMENTS

2010/0175302 A1\* 7/2010 Allen .................... A01M 31/06
43/3
2013/0305586 A1\* 11/2013 Forrester ............... A01M 31/06
43/2

\* cited by examiner

DEER HUNTING DECOY

FIELD OF THE INVENTION

The present invention relates to a hunting decoy especially configured for attracting white tail deer to a hunter's location by visual stimulus.

BACKGROUND OF THE INVENTION

Hunters use various methods to attract white tail deer to the hunter's location. In a first instance, scents and sounds can be used to lure deer to a vicinity. Such methods often are deficient because the deer do not approach the hunters location within shooting distance without additional visual confirmation of the presence of other animals.

White tail deer use their tails as a visual means of communicating with other deer. For example, does will raise their tails to signal that they are ready to breed. Bucks recognize and are attracted to a doe's tail raising display. Accordingly, visual attractors (decoys) have been proposed for hunting white tail deer.

U.S. Pat. No. 5,791,081 is a deer tail decoy that can be affixed to a heavy, full-sized deer body decoy structure. The white portion of the deer tail decoy is visible continually, and does not attract a deer's attention. Moreover, the hunter must carry and maintain a full-sized deer body decoy structure.

U.S. Pat. No. 5,546,692 proposes a deer decoy resembling the hind quarters of a white tail deer. The decoy may be mounted into a ground surface with two stakes. Tails are attached onto ends of a metal drive rod for pivotal movement and are displayed at opposite sides of the decoy. The molded plastic body comprises two halves with a hollow area inside to house electronic mechanism (a small motor, rheostat, radio control, battery) and the metal drive rod. The electronic mechanism enables tails attached to the drive rod to be moved to the left and to the right to simulate deer tail movement. The decoy is cumbersome with its molded plastic body and lacks head and neck features to simulate a doe or a buck. The electronic mechanism adds complexity.

Notwithstanding various attempts to create deer decoys that are effective in attracting the attention of deer, the current decoys either fail to simulate the movement of a deer tail to a sufficient degree to attract and maintain the attention of deer, fail to permit a hunter to control their movement, and/or require burdensome mounting structure. Hunters continue to seek simple to operate, lightweight, and compact deer decoys that mimic the tail display motion of white tail deer.

SUMMARY OF THE INVENTION

In a first aspect, a deer hunting decoy has a hollow or substantially hollow central post having a sidewall, a proximal end and a distal end and defining a length. The central post has a stake or forms a stake at its distal end that is adapted for staking the deer hunting decoy to a ground surface. The central post has an opening at its proximal or top end. The central post further defines at least one opening through its sidewall. An axle bar extends radially outwardly from the central post. The axle bar has a first end and a second end, and preferably is shaped as (a) a w-shaped axle bar or (b) a weldment with a v-shaped activation bar and an angled U-shaped tension bar. A flexible cover extends over a substantial portion of the central post. The cover is configured with an opening to expose the opening at the proximal end of the central post. The cover has a front face and a rear face, with each of the front face and rear face colored to simulate, suggest or resemble hind quarters of a deer and with each including a substantially lighter colored central portion surrounding by a substantially darker colored border. A first tail flap overlays over the substantially lighter central portion of the front face, with the first tail flap joined to the first end of the axle bar. A second tail flap overlays over the substantially lighter central portion of the rear face, said second tail flap joined to the second end of the axle bar. The first tail flap and the second tail flap are of a shape to substantially cover the respective substantially lighter central portions of the cover in a respective first position, and upon rotating or twisting the axle bar said first tail flap and second tail flap each are rotatable to a respective second position to expose at least a portion of each substantially lighter central portion of the cover. A pull cord is joined at one end directly or indirectly to the axle bar and threaded through at least a portion of the length of the central post. The pull cord is threaded through the at least one opening through the central post to extend a portion of the pull cord outside of the deer hunting decoy. Upon tugging or pulling on the pull cord, the axle is caused to rotate, which in turn causes movement of the first and second tail flaps. A decoy deer head or silhouette is removably attachable to the deer hunting decoy.

In a preferred embodiment, the decoy deer head is a silhouette having a post end that releasably fits within the opening at the proximal end of the central post. The cover may have one or more fasteners, such as zippers or a double zipper, to selectively open and substantially close the flexible cover opening.

In another preferred embodiment, the decoy deer head is a silhouette of a buck having a post end that releasably fits within the central opening at the proximal end of the central post, and wherein the double zipper is substantially closed to retain the decoy deer head in position within the central opening at the proximal end of the central post.

In yet another embodiment, the decoy deer head is a silhouette having a deer head at one end and a hook shape at an opposite end. In this embodiment, the decoy deer head is a silhouette of a doe having a deer head at one end and a hook shape at an opposite end. The hook shape is releasably joinable to the flexible cover at the flexible cover opening. The fastener, such as a zipper or double zipper closure, is substantially closed to retain the decoy deer head in position. A pin may be attached to the deer head end of the decoy deer head, with said pin adapted for staking the deer head end to the ground.

Preferably, the deer hunting decoy includes a resilient band joined to the axle bar, and the pull cord is joined to the resilient band. The resilient band applies tension force opposing the tugging or pulling motion applied to the pull cord, which tension force urges the pull cord to a neutral position such that the axle bar is not rotated.

In one preferred embodiment, the axle bar is substantially W-shaped, and the central portion of the 'W" is within the central post. The ends of the W-shaped axle bar extend through holes formed through the central portion, with the first end extending also through the front face of the cover and to which the first tail flap is joined, and with the second end extending also through the rear face of the cover and to which the second tail flap is joined. The resilient band may be wrapped about lower portions of the W-shaped axle bar and partly around the central post. The pull cord preferably is joined to the resilient band, and may be redirected by contact with one or more redirection bars within the cover or within the central portion.

In another preferred embodiment, the axle bar is a weldment consisting of an axle bar with mounting tabs, a V-shaped activation bar and an angled U-shaped tension bar. The central part of the axle bar is within the central post. The ends of the axle bar extend through holes formed through the central portion, with the first end extending through the front face of the cover and to which the first tail flap is joined, and with the second end extending also through the rear face of the cover and to which the second tail flap is joined. The resilient band may be wrapped about lower portions of the tension bar and partly around the central post.

The cover may be supported by supporting structure that includes the central portion, a first frame within the cover to stabilize the first face and a second frame within the cover to stabilize the second face. The first frame and the second frame may each comprise cylindrical tubes bent to a substantially inverted U-shape. In some embodiments, the tubes may comprise foam or flexible plastic, such as PEX. The flexible cover may be textile, such as canvas, or other fabric of suitable durability for outdoor use. Suitable fabrics include polyester-cotton blends, nylon, Rayon and denim. If desired, the fabric may be stiffened by joining the fabric to a facing fabric or other stiffening substrate.

The first tail flap and second tail flap have front faces of a substantially darker color to simulate color of fur of a deer, and rear faces of a substantially lighter color. The first tail flap and the second tail flap may be textile, comparable to the cover. A stiffening wire may be held between the front and rear faces of a tail flap.

In yet another embodiment, a method of attracting deer uses the deer hunting decoy according to the invention. To form a deer hunting decoy resembling or suggesting a buck, the deer decoy head is inserted into the central post, and the flexible cover is substantially closed around the deer decoy head. The deer hunting decoy is staked to the ground by the stake end of the deer hunting decoy.

In still another embodiment, a method of attracting deer uses the deer hunting decoy according to the invention. To form a deer hunting decoy resembling or suggesting a grazing doe, a hook portion of the deer decoy head is inserted over an edge of the opening of the flexible cover. The opening of the flexible cover is substantially closed to engage the hook portion. The deer hunting decoy is staked to the ground by the stake end of the deer hunting decoy. A portion of the deer decoy head is pinned to the ground.

DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF EMBODIMENTS

Figure 1:
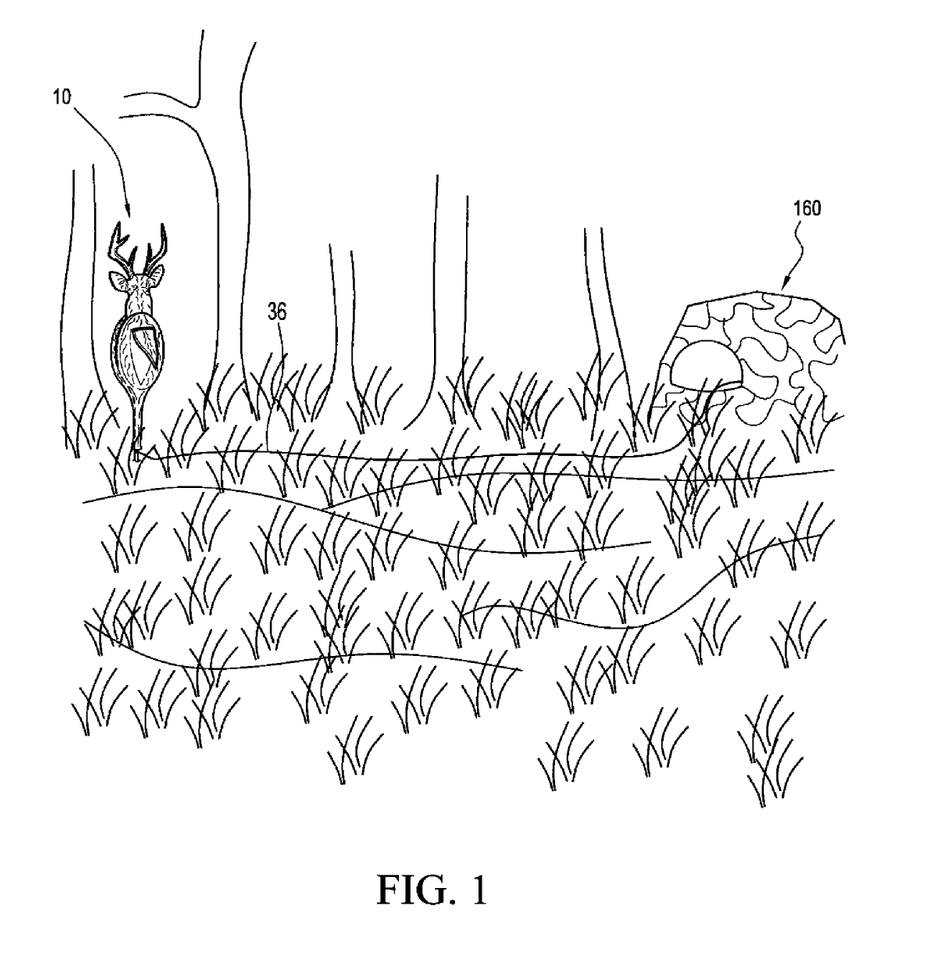
FIG. 1 is schematic illustration of a deer hunting decoy according to the invention placed in a hunting location a distance from a hunting blind.
Figure 2:
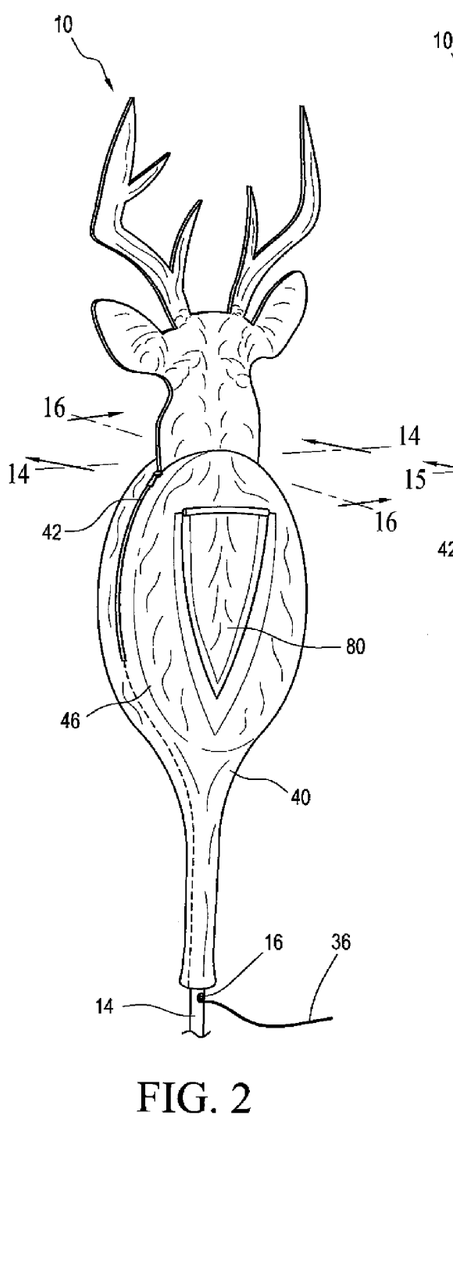
FIG. 2 is left front perspective view of a deer hunting decoy according to the invention with a buck head insert and with a tail flap in a down direction.
Figure 3:
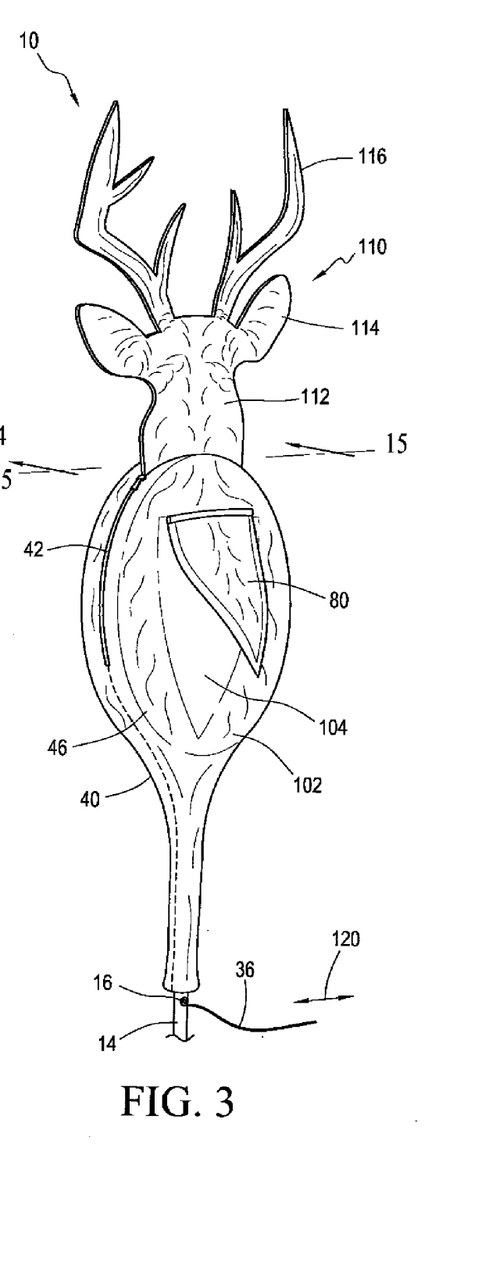
FIG. 3 is a left front perspective view of the deer hunting decoy of FIG. 2, with the tail flap in a rotated position.

Referring to FIG. 1, a deer hunting decoy 10 is shown staked into the ground at the edge of a stand of trees and at a distance spaced apart from a hunting blind 160. A pull cord 36 extends from the deer hunting decoy 10 to the hunting blind 160. A hunter positioned within the hunting blind 160 may pull on the pull cord 36 to cause rotational tail movement of the deer hunting decoy 10.

Referring next to FIGS. 2, 3, 9, 12, 13, 14, 15 and 16, the deer hunting decoy 10 has a central tube 12 extending vertically within the inside volume of the deer hunting decoy 10. The central tube 12 has a stake end 14 at its bottom or distal end and a shoulder 18 at its top or proximal end. At least one hole 16 is formed through the sidewall of the central tube 12 at or near its stake end 14. At least one first hole 22 and one second hole 24 are formed through the sidewall of the central tube at or near its top or proximal end.

The central tube 12 is rigid or substantially rigid, and may be formed of a metal or polymer or plastic, such as PVC pipe, of about 2 to 5 cm in diameter.

A w-shaped axle bar 30 (FIGS. 13 and 16) is threaded through the first hole 22 and second hole 24 of the central tube. The w-shaped axle bar 30 is adapted for rotation. One end 34 of the w-shaped axle bar 30 is connected directly or indirectly to a first tail flap 80. The opposite end 32 of the w-shaped axle bar 30 is connected directly or indirectly to a second tail flap 82.

Figure 13:
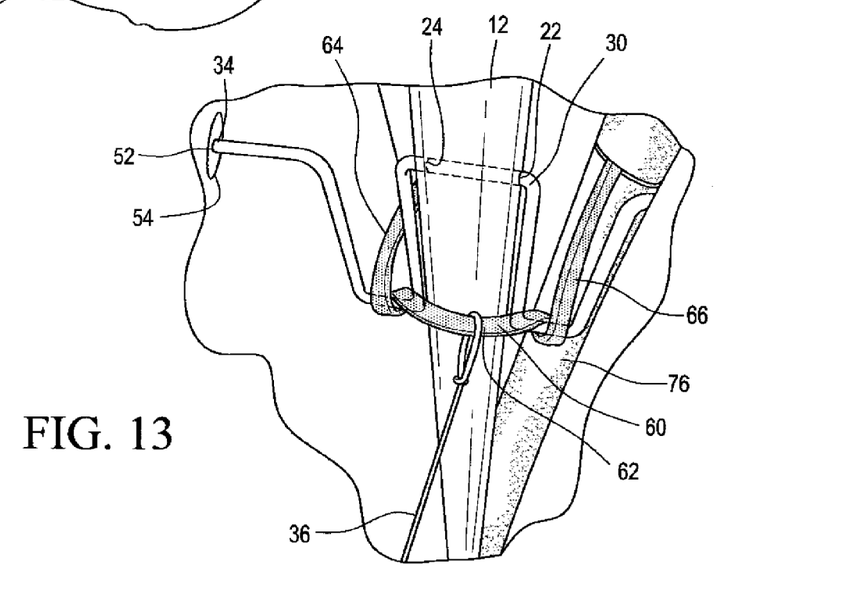
FIG. 13 is a magnified view of the bent rod to which the tail flaps are attached and resilient member wrapped about the bent rod and to which the pull cord is attached.
Figure 16:
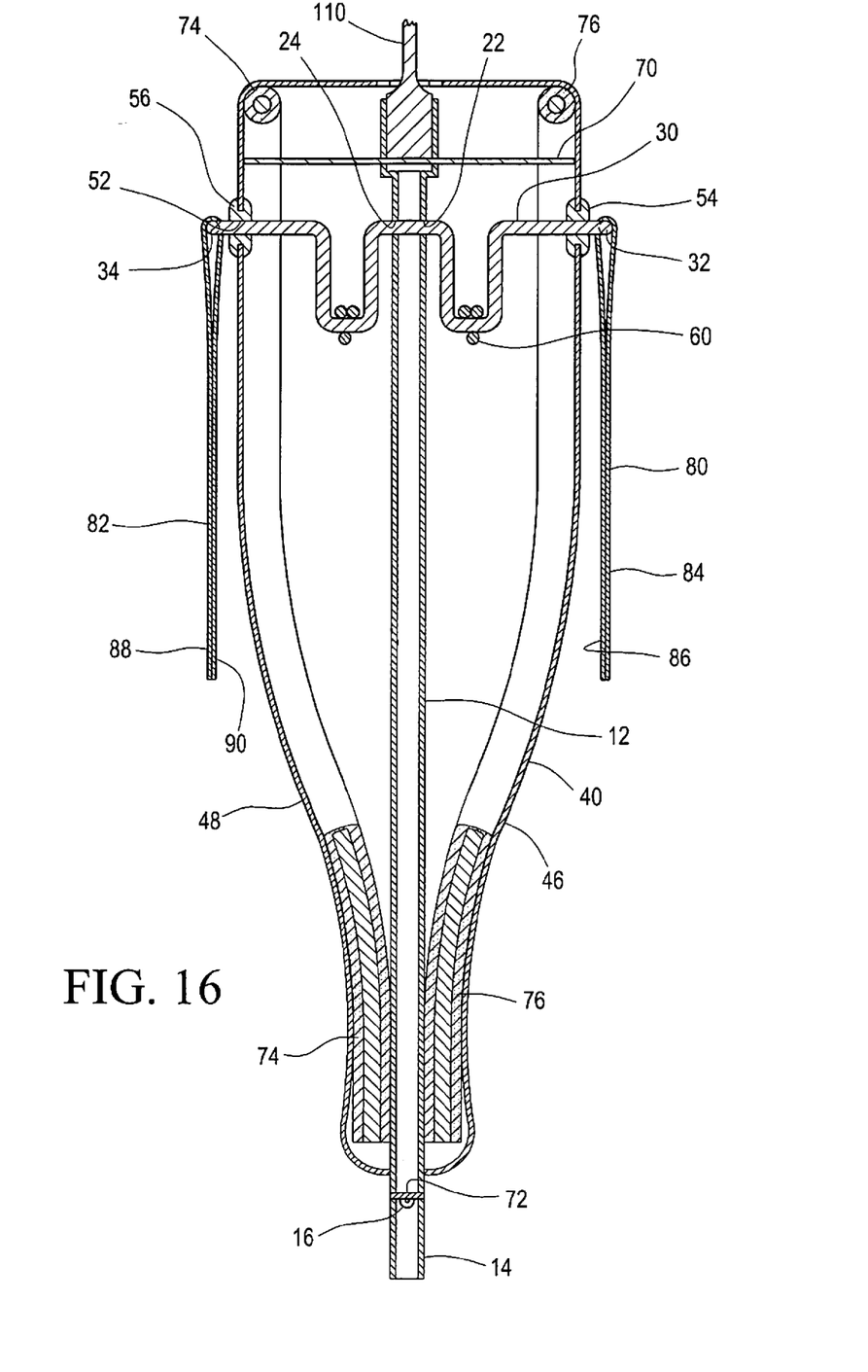
FIG. 16 is a cross-sectional view of the deer hunting decoy taken along line 16-16 in FIG. 2.

A resilient band 60 is looped between bends of the w-shaped axle bar 30 and then around a portion of the exterior circumference of the central tube 12. The resilient band 60 may be an elastomeric band having a thickness of about 1 to 4 mm and a length of about 10 to 20 cm. The first end 64 of the resilient band 60 is joined to support structure of the deer hunting decoy, and the second end 66 of the resilient band 60 is joined to opposite support structure of the deer hunting decoy.

Figure 14:
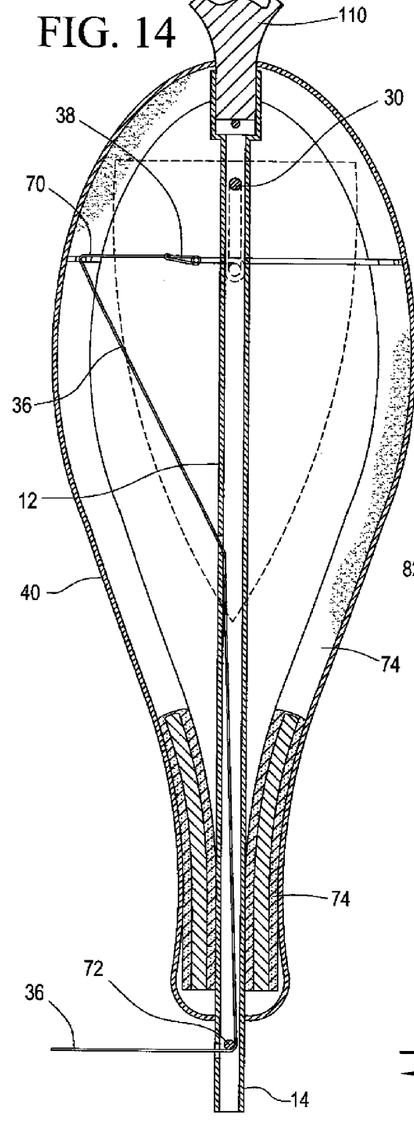
FIG. 14 is a cross-sectional view of the deer hunting decoy taken along line 14-14 in FIG. 2.
Figure 15:
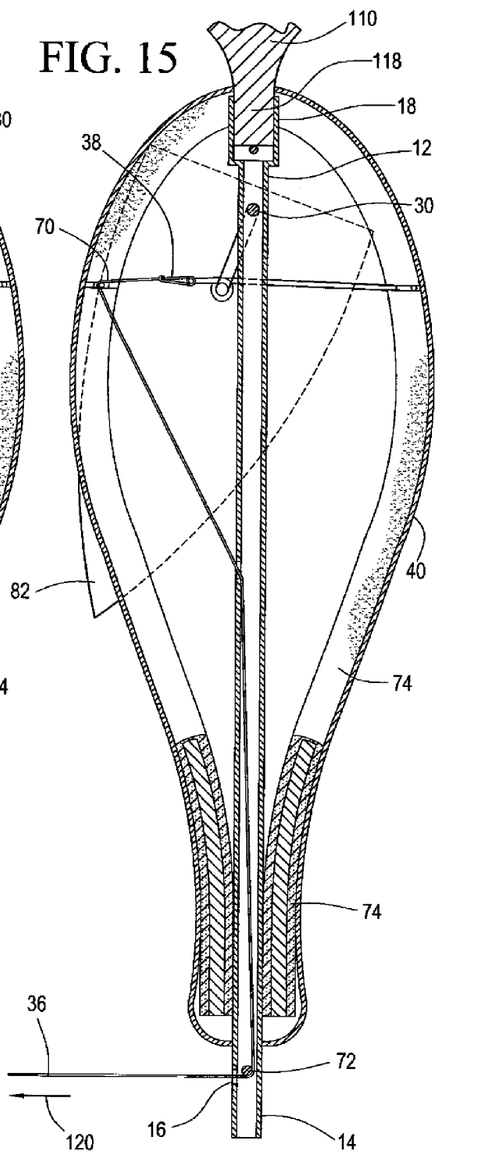
FIG. 15 is a cross-sectional view of the deer hunting decoy taken along line 15-15 in FIG. 3.

One end 38 of the pull cord 36 is joined or tied to the resilient band 60. As shown in FIGS. 13-15, the end 38 is tied to the resilient band 60 at that portion of the resilient band that extends around a portion of the exterior circumference of the central tube 12. The pull cord 36 is threaded around a redirection bar 70 that spans across an internal depth of the deer hunting decoy 10. The pull cord 36 also is threaded around a second redirection bar 72 at or near the stake end 14 of the central tube 12. From there, the pull cord 36 is threaded through hole 16 and out of the deer hunting decoy 10.

Figures 8, 9, 10, 11:
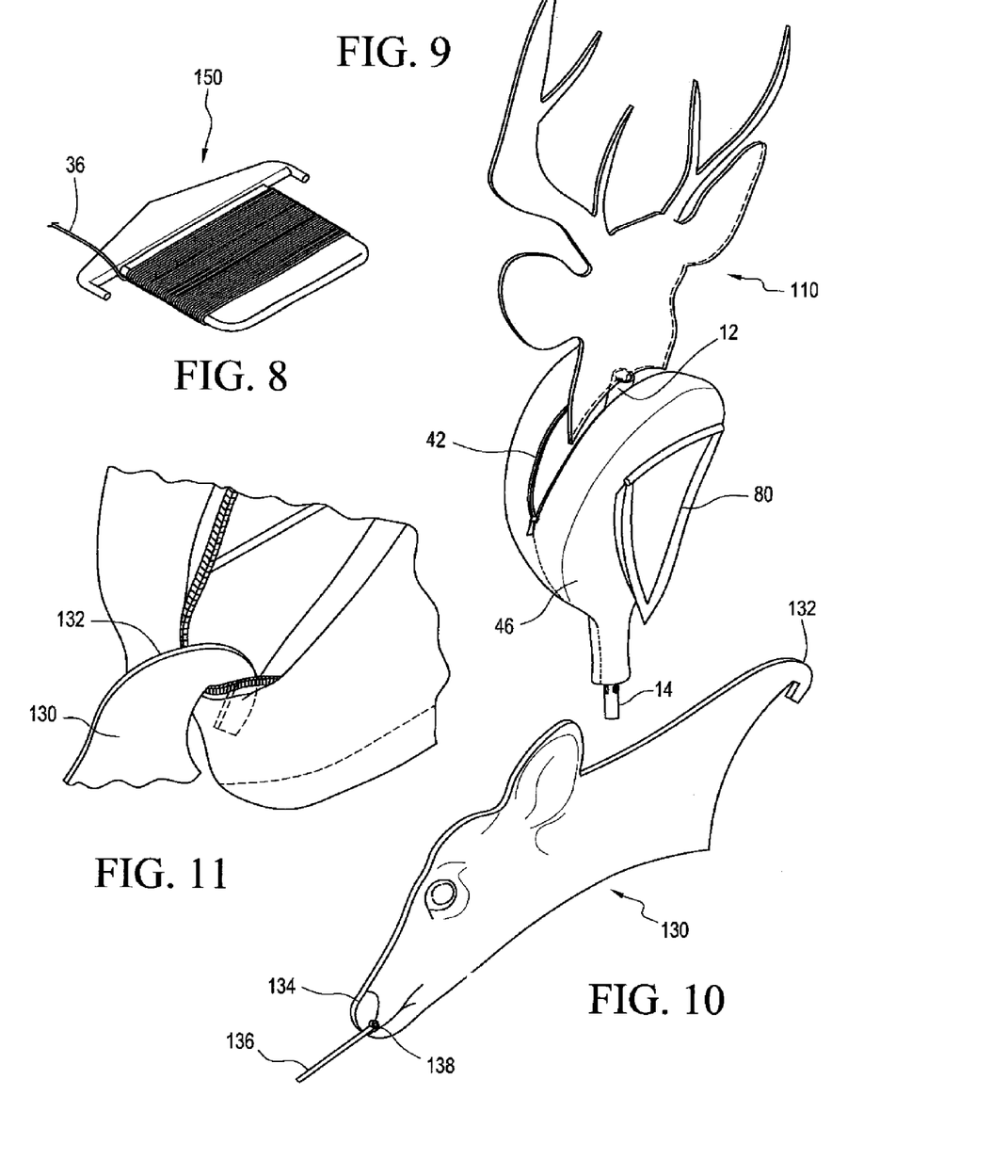
FIG. 8 is a spool or string holder wrapped with a pull cord.
FIG. 9 is a left front top perspective view of the deer hunting decoy of FIG. 2.
FIG. 10 is a left front perspective view of the grazing doe head insert.
FIG. 11 is a left front top partial perspective view of the deer hunting decoy of FIG. 4 showing attachment of the grazing doe head insert.
Figure 12:
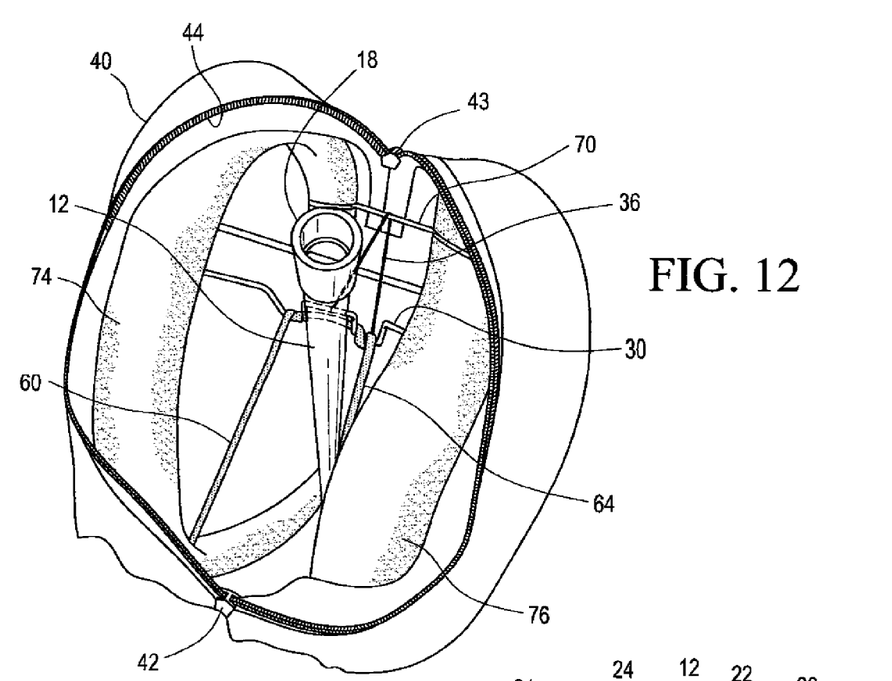
FIG. 12 is a left front top partial perspective view of the deer hunting decoy of FIG. 2 with the buck head insert removed, showing structure within the internal cavity of the deer hunting decoy.

The opposite end of the pull cord 36 from that which is tied to the resilient band 60 which is outside of the deer hunting decoy 10 may be wrapped about a spool or string holder 150 (FIG. 8). The hunter may release a desired length of the pull cord 36 from the spool or string holder 150 when the deer hunting decoy 10 is staked a distance from the hunter's intended location, such as in a hunting blind 160.

A first bent tube 74 shaped into a generally inverted U shape is disposed to one side of the central tube 12. A second bent tube 76 shaped into a generally inverted U shape is disposed to one side of the central tube 12 opposite from the position of the first bent foam tube 74. The bent tubes 74, 76 together with the central tube 12 form supporting inner structure of the deer hunting decoy 10. The tubes 74, 76 may be formed of a plastic flexible tubing, such as PEX, or of a foam, such as polystyrene or polyurethane, and may be coated with a film for improved weather/moisture resistance.

A cover 40 extends over the supporting inner structure. The cover 40 is Open at the distal end so that the stake end 14 of the central tube 12 extends out of the distal end of the cover. The cover 40 has an open top end 44 with a first zipper 42 and a second zipper 43 extending across the open top end 44 so that the open top end may be various closed by action of first zipper 42, or second zipper 43. Alternatively, the open top end 44 may be left partially open to expose the shoulder 18 at the proximal end of the central tube 12.

The cover 40 is formed to suggest or resemble the hind quarters of a standing deer. The cover 40 has a front face 46 and a rear face 48. Each of the front face 46 and rear face 48 is patterned with coloration of a deer, such as brown fur 102 and white rump 104. The front face 46 of the cover 40 defines a hole 50 stabilized by a grommet 54 through which one end of the w-shaped axle bar 30 is threaded. The rear face 48 of the cover 40 similarly defines a hole 52 stabilized by a grommet 56.

The flexible cover 40 may be textile, such as canvas, or other fabric of suitable durability for outdoor use. Suitable fabrics include polyester-cotton blends, nylon, Rayon and denim. If desired, the fabric may be stiffened by joining the fabric to a facing fabric or other stiffening substrate. If desired, the fabric may be coated with a moisture barrier film or coating.

The first tail flap 80 is joined to one end of the w-shaped axle bar 30. The first tail flap 80 has a front face 84 and a rear face 86, with the rear face having the coloration of a bottom side of a tail of deer, such as white, and the front face having the coloration of the deer tail when the tail is down, such as brown.

The second tail flap 82 is joined to the opposite end of the w-shaped axle bar 30. The second tail flap 82 has a front face 88 that is generally brown and has a rear face 90 that is generally white to mimic coloration of a deer tail.

Figures 6, 7:
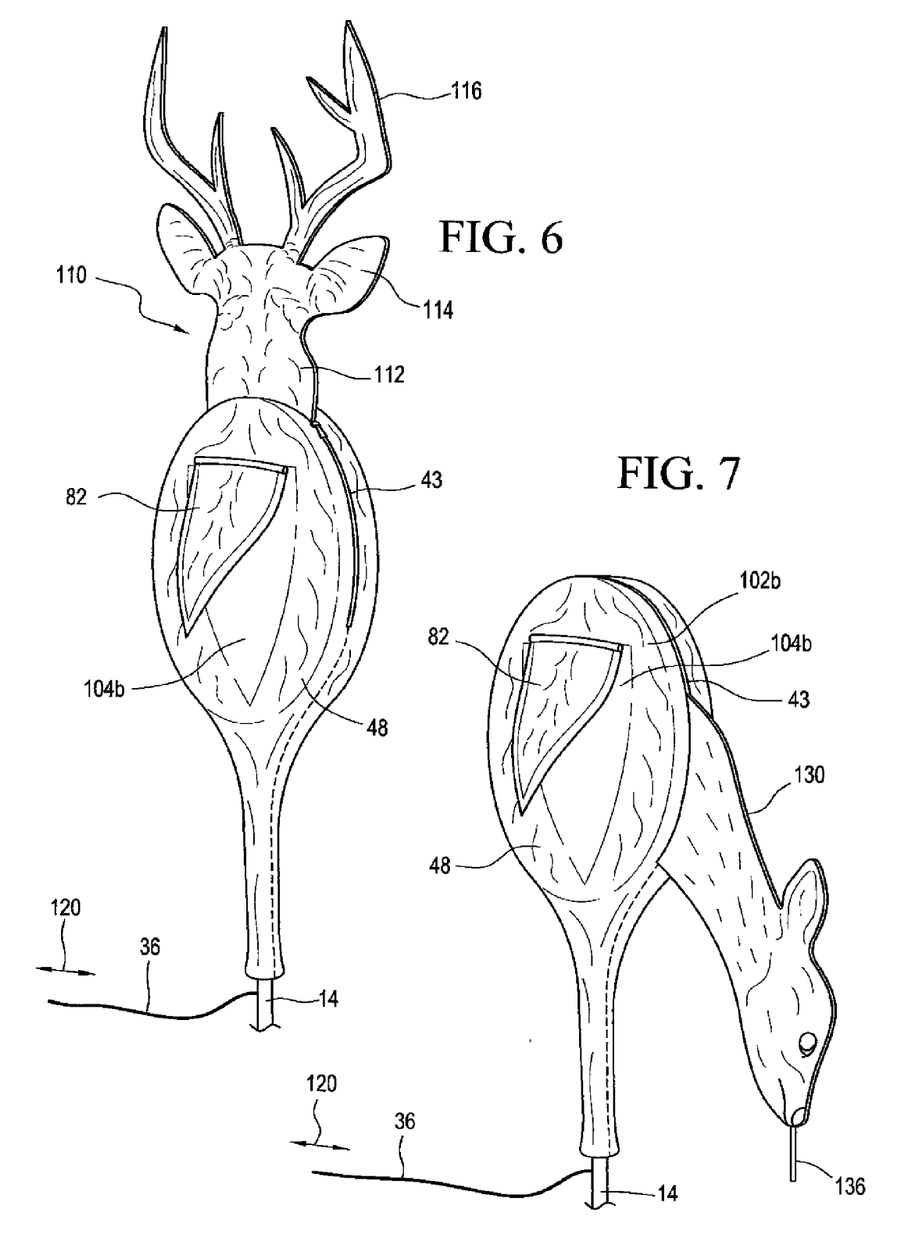
FIG. 6 is a right rear perspective view of the deer hunting decoy of FIG. 2 with a second tail flap in a rotated position.
FIG. 7 is a right rear perspective view of the deer hunting decoy of FIG. 4 with a second tail flap in a rotated position.

Upon pulling or tugging on the pull cord 36 in the direction of arrow 120 (e.g., FIGS. 3, 15), the w-shaped axle bar 30 is rotated to cause both the first and second tail flaps 80, 82 to rotate with each pull or tug. The first tail flap 80 rotates from a position covering the white portion 104a of the outside cover 40, to a position that exposes the white portion 104a of the outside cover 40 to view. Compare FIGS. 2 and 3. With the same tug motion, the second tail flap 82 rotates from a position covering the white portion 104b of the outside cover 40 to a position that exposes the white portion 104b of the outside cover 40 to view (See FIG. 6). The resilient band exerts a spring force to return the pull cord upon release of the pull or tug on the pull cord 36. Hence, the tail flaps 80, 82 may be rotated to expose the white portions 104a, b of the cover 40, and then returned to positions covering the white portions. In this manner, natural deer-like tail movements may be effected by pulling or tugging and releasing the pull cord 36.

Figures 4, 5:
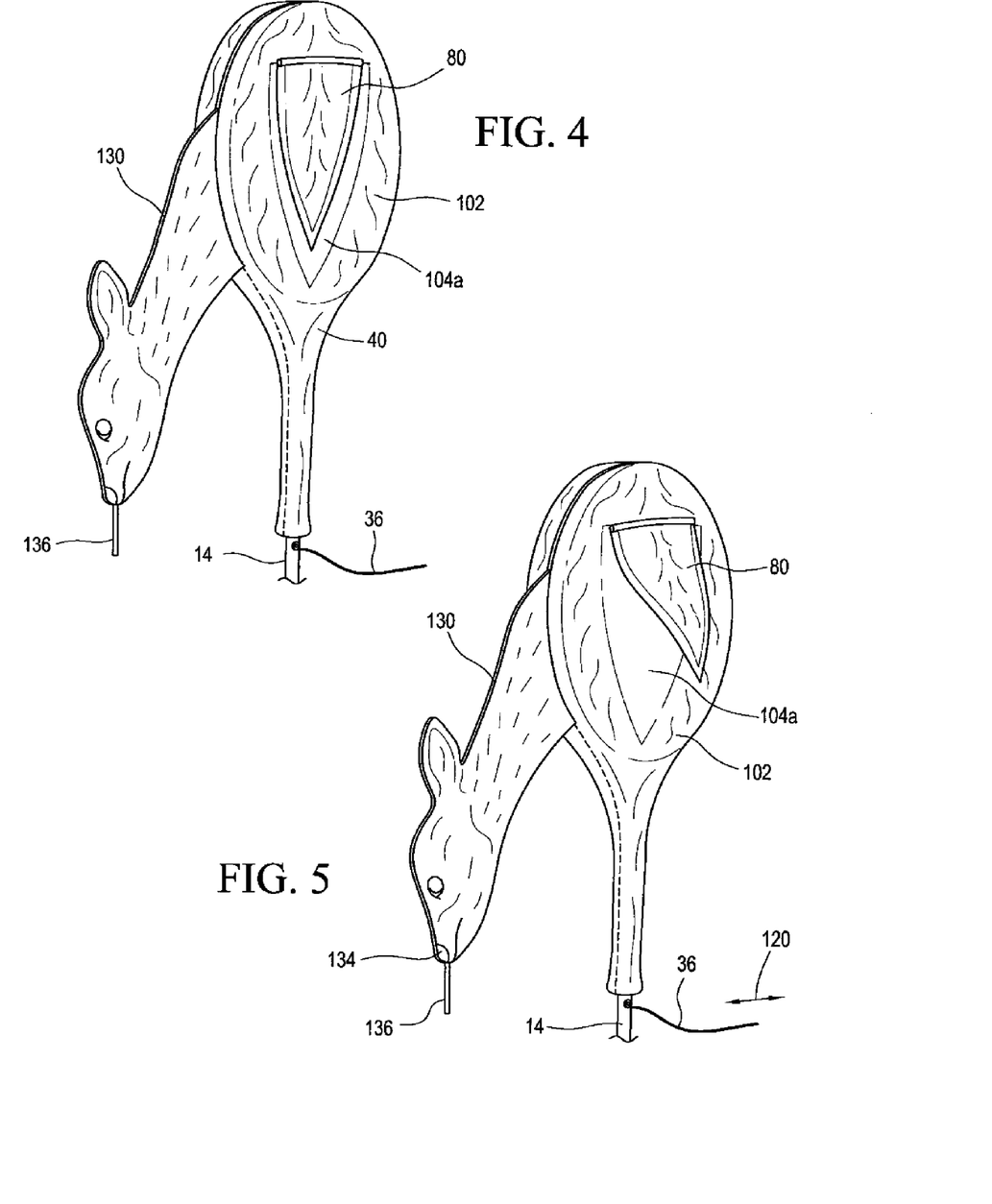
FIG. 4 is a left front perspective view of a deer hunting decoy according to the invention with a grazing doe head insert and with a tail flap in a down direction.
FIG. 5 is a left front perspective view of the deer hunting decoy of FIG. 4 with the tail flap in a rotated position.

The deer hunting decoy 10 may variously be used in the form of a challenging (e.g. standing) buck or a grazing doe. Compare FIGS. 2 and 3 (standing buck) with FIGS. 4 and 5 (grazing doe). To create the standing buck, a buck silhouette 110 is inserted into the shoulder portion 18 of the central tube 12 of the deer hunting decoy 10. See FIG. 9. The buck silhouette 110 has a head 112, with extending ears 114 and extending antlers 116. The buck silhouette may be formed as a foam board or poster board or plywood sheet with ornamentation to replicate or suggest a rear head of a standing buck. The same or different ornamentation may be applied to each of the front face and rear face of the buck silhouette. The bottom portion of the buck silhouette terminates in a tube end 118 that releasably fits within the upper open shoulder 18 of the central tube 12. First zipper 42 and second zipper 43 are moved to close the opening of the cover 40 around the buck silhouette 110.

To create the grazing doe, a doe silhouette 130 has a head portion with a nose 134 at its distal end and a J-shaped or U-shaped hook 132 at its proximal end. See FIG. 10. A pin 136 is joined for rotation by axle 138 at or close to the nose 134. The doe silhouette may be formed as a foam board or poster board or plywood sheet with ornamentation to replicate or suggest a neck and head of a grazing doe. The same or different ornamentation may be applied to each of the front face and rear face of the doe silhouette. The hook 132 is linked over an edge of the open top of the cover 40 (FIG. 11). The zipper 42 is then closed to close the opening 44 at the top of the cover 40 and secure the doe silhouette 130 to the cover 40. The doe silhouette 130 is placed with the nose 134 directed toward the ground. The pin 136 is staked into the ground to stabilize the doe silhouette 130 in position to create the impression of a grazing doe.

The deer hunting decoy 10 is lightweight and portable. The buck silhouette 110 and the doe silhouette 130 may be removed from the cover and stabilizing structure for transport. The cover 40 and the central tube 12 and foam tubes 74, 76 may be stacked together for storage and transport. The zippers 42, 43 may be closed to protect the w-shaped axle bar 30 and resilient band 60 and other structure within the cover. The cover 40 in its closed orientation has the general shape of a tennis racquet cover.

Figure 17:
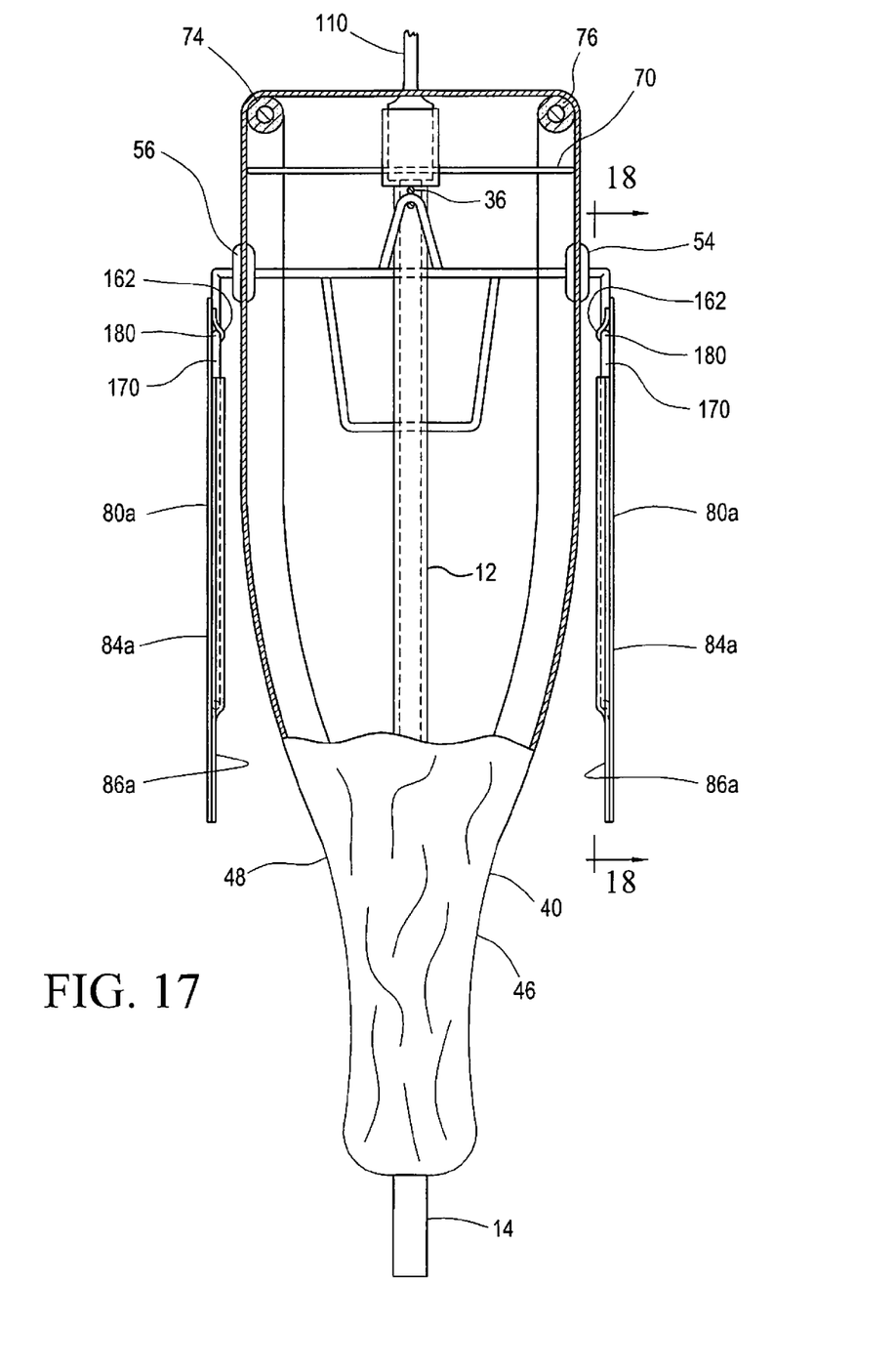
FIG. 17 is a partial cross-sectional view of a variant of a deer hunting decoy according to the invention with an alternative axle bar for causing tail flap movement and alternative tail flaps.
Figure 18:
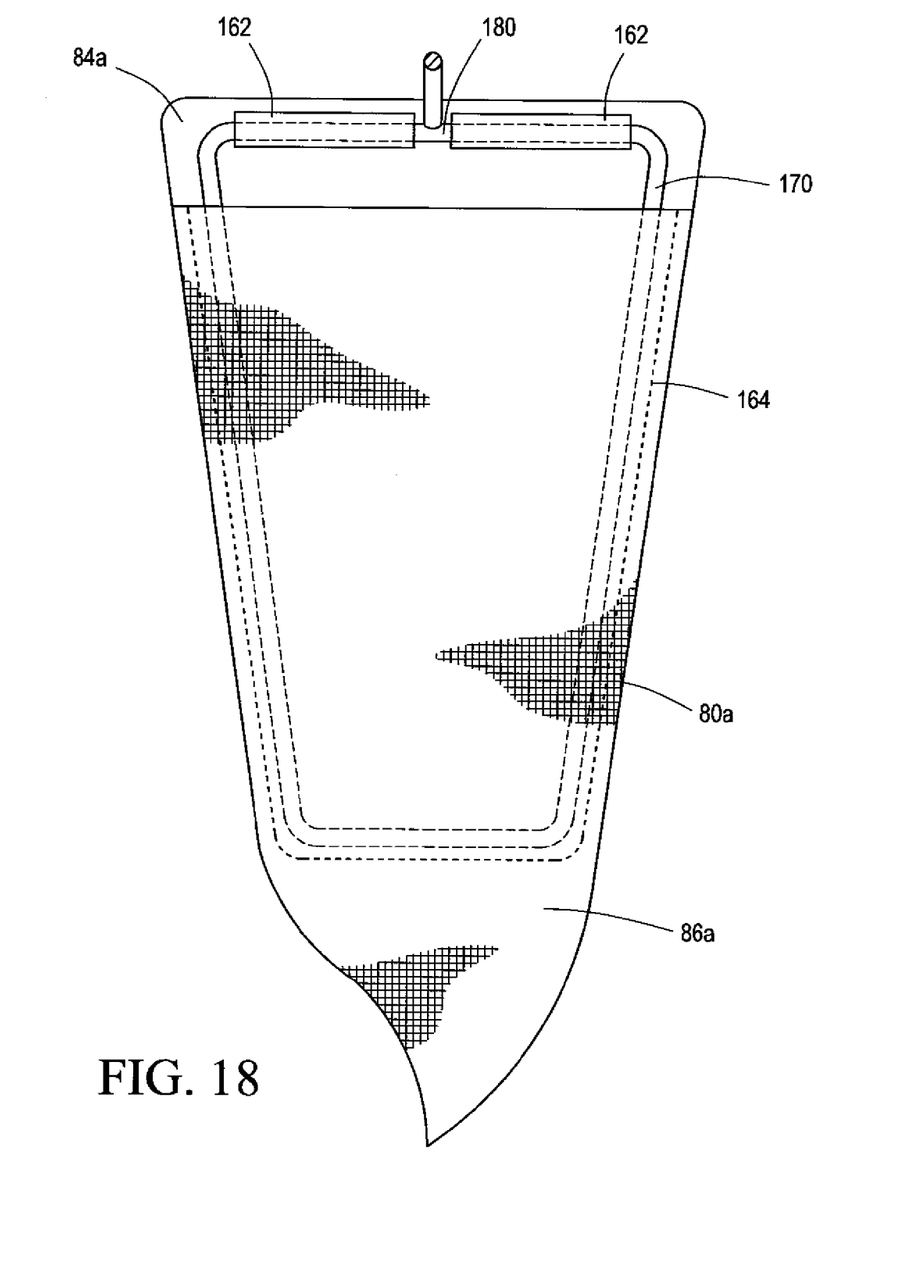
FIG. 18 is a cross-sectional view taken along line 18-18 in FIG. 17 showing one of the tail flaps of the deer hunting decoy of FIG. 17.

Referring next to FIGS. 17 and 18, a variant of the deer hunting decoy 200 is shown in partial cross-sectional view. Like parts have the same reference numbers as applicable to earlier Figures. In this variant, the w-shaped axle bar is replaced by a weldment consisting of an axle bar 202 with mounting tabs, a V-shaped activation bar 204 and an angled U-shaped tension bar 206. The central part of the axle bar is within the central post 12. The ends of the axle bar extend through holes 50, 52 formed through the central portion that are reinforced by grommets 54, 56, with the first end extending through the front face 46 of the cover 40 and to which the first tail flap 80a is joined, and with the second end extending also through the rear face 48 of the cover 40 and to which the second tail flap 82a is joined. The pull cord 36 is attached to the V-shaped activation bar 204 and is threaded through the central post 12. Pulling the pull cord 36 causes the axle bar 202 to rotate, and causes pivotal movement or back and forth twitching rotational movement of the tail flaps 80a. The angled U-shaped tension bar 206 acts as a counter weight to the force applied to the V-shaped activation bar 204 when the pull cord 36 is pulled. Upon releasing the pull cord 36, the weight of the angled U-shaped tension bar 206 causes downward movement of the U-shaped tension bar 206, which urges the axle bar 202 to rotate back to its neutral position. Optionally, a resilient band (not shown) may be wrapped about lower portions of the tension bar and partly around the central post for further tension to counter the pull tension on the pull cord 36.

The tail flaps 80a, 82a of this variant have a front face 84a and an opposite rear face 86a with a stiffening means therein. Referring to FIG. 18, the tail flap 80a has a bent wire 170 held between the front face 84a and rear face 86a to stiffen the tail flap. The wire 170 is maintained between the front face and rear face by stitching 164 and by a sleeve 162 joined to a backside of the front face 84a. A fitting 180 secures the bent wire 170 to an end of the axle bar 202. Optionally, the tail flap 80a shown in FIG. 18 may be used in association with the variant of the deer hunting decoy shown in FIGS. 1-16.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A deer hunting decoy, comprising:
    a hollow or substantially hollow central post having a sidewall, a proximal end and a distal end and defining a length, said central post having a stake or forming a stake at its distal end adapted for staking the deer hunting decoy to a ground, and said central post having an opening at its proximal end;
    an axle bar extending radially outwardly from the central post, said axle bar having a first end and a second end;
    a flexible cover over a substantial portion of the central post, said cover configured with an opening to expose the opening at the proximal end of the central post, and said cover having a front face and a rear face, with each of the front face and rear face colored to resemble hind quarters of a deer and with each including a substantially lighter colored central portion surrounding by a substantially darker colored border;
    a first tail flap overlaid over the substantially lighter central portion of the front face, said first tail flap joined to the first end of the axle bar;
    a second tail flap overlaid over the substantially lighter central portion of the rear face, said second tail flap joined to the second end of the axle bar;
    wherein said first tail flap and said second tail flap are of a shape to substantially cover the respective substantially lighter central portions in a respective first position, and upon rotating or twisting the axle bar said first tail flap and second tail flap each are rotatable to a respective second position to expose at least a portion of each substantially lighter central portion;
    a pull cord joined at one end directly or indirectly to the axle bar and having a portion that extends outside of the deer hunting decoy, wherein tugging on the pull cord causes the axle to rotate; and
    a decoy deer head removably attachable to the deer hunting decoy, wherein the decoy deer head is a silhouette having a post end that releasably fits within the opening at the proximal end of the central post.

2. The deer hunting decoy of claim 1, further comprising at least one fastener to selectively open and substantially close the flexible cover opening.

3. The deer hunting decoy of claim 2, wherein the at least one fastener comprises a double zipper.

4. The deer hunting decoy of claim 3, wherein the double zipper is substantially closed to retain the decoy deer head in position within the central opening at the proximal end of the central post.

5. The deer hunting decoy of claim 1, further comprising a resilient band joined to the axle bar, with said pull cord joined to the resilient band.

6. The deer hunting decoy of claim 1, wherein the axle bar is substantially W-shaped, said bar having its central portion within the central post, said axle bar extending through holes formed through the central portion and having a first end extending through the front face and to which the first tail flap is joined and having a second end extending through the rear face of the cover and to which the second tail flap is joined.

7. The deer hunting decoy of claim 6, wherein the resilient band is wrapped about lower portions of the W-shaped axle bar and partly around the central post, and the pull cord is joined to the resilient band.

8. The deer hunting decoy of claim 7, further comprising a redirection bar within the cover and over which the pull cord is drawn.

9. The deer hunting decoy of claim 1, wherein the axle bar is a weldment with a V-shaped action bar and an opposing counter weight, said axle bar having its central portion within the central post, said axle bar extending through holes formed through the central portion and having a first end extending through the front face and to which the first tail flap is joined and having a second end extending through the rear face of the cover and to which the second tail flap is joined.

10. The deer hunting decoy of claim 9, wherein the pull cord is attached at one end to the V-shaped action bar.

11. The deer hunting decoy of claim 1, further comprising a first frame within the cover to stabilize the first face and a second frame within the cover to stabilize the second face.

12. The deer hunting decoy of claim 11, wherein the first frame and the second frame each comprise cylindrical tubes bent to a substantially inverted U-shape.

13. The deer hunting decoy of claim 1, wherein the flexible cover is textile.

14. The deer hunting decoy of claim 1, wherein the first tail flap and second tail flap have front faces of a substantially darker color to simulate color of fur of a deer, and rear faces of a substantially lighter color.

15. The deer hunting decoy of claim 1, wherein the central post defines at least one opening through its sidewall, and a portion of the length of the pull cord is threaded through at least a portion of the length of the central post and through the at least one opening through the sidewall of the central post.

16. A deer hunting decoy, comprising:
a hollow or substantially hollow central post having a sidewall, a proximal end and a distal end and defining a length, said central post having a stake or forming a stake at its distal end adapted for staking the deer hunting decoy to a ground,
an axle bar extending radially outwardly from the central post, said axle bar having a first end and a second end;
a flexible cover over a substantial portion of the central post, said cover configured with an opening to expose the opening at the proximal end of the central post, and said cover having a front face and a rear face, with each of the front face and rear face colored to resemble hind quarters of a deer and with each including a substantially lighter colored central portion surrounding by a substantially darker colored border;
a first tail flap overlaid over the substantially lighter central portion of the front face, said first tail flap joined to the first end of the axle bar;
a second tail flap overlaid over the substantially lighter central portion of the rear face, said second tail flap joined to the second end of the axle bar;
wherein said first tail flap and said second tail flap are of a shape to substantially cover the respective substantially lighter central portions in a respective first position, and upon rotating or twisting the axle bar said first tail flap and second tail flap each are rotatable to a respective second position to expose at least a portion of each substantially lighter central portion;
a pull cord joined at one end directly or indirectly to the axle bar and having a portion that extends outside of the deer hunting decoy, wherein tugging on the pull cord causes the axle to rotate; and
a decoy deer head removably attachable to the deer hunting decoy, wherein the decoy deer head is a silhouette having a head at one end and a hook shape at an opposite end.

17. The deer hunting decoy of claim 16, further comprising at least one fastener to selectively open and substantially close the flexible cover opening.

18. The deer hunting decoy of claim 17, wherein the decoy deer head is a silhouette of a doe having a deer head at one end and a hook shape at an opposite end, and wherein the hook shape is releasably joinable to the flexible cover at the flexible cover opening, and wherein the fastener is substantially closed to retain the decoy deer head in position.

19. The deer hunting decoy of claim 16, further comprising a pin attached to the deer head end of the decoy doe head, said pin adapted for staking the deer head end to the ground.

20. A deer hunting decoy, comprising:
a hollow or substantially hollow central post having a sidewall, a proximal end and a distal end and defining a length, said central post having a stake or forming a stake at its distal end adapted for staking the deer hunting decoy to a ground, and said central post having an opening at its proximal end;
an axle bar extending radially outwardly from the central post, said axle bar having a first end and a second end;
a flexible cover over a substantial portion of the central post, said cover configured with an opening to expose the opening at the proximal end of the central post, and said cover having a front face and a rear face, with each of the front face and rear face colored to resemble hind quarters of a deer and with each including a substantially lighter colored central portion surrounding by a substantially darker colored border;
a first tail flap overlaid over the substantially lighter central portion of the front face, said first tail flap joined to the first end of the axle bar;
a second tail flap overlaid over the substantially lighter central portion of the rear face, said second tail flap joined to the second end of the axle bar;
wherein said first tail flap and said second tail flap are of a shape to substantially cover the respective substantially lighter central portions in a respective first position, and upon rotating or twisting the axle bar said first tail flap and second tail flap each are rotatable to a respective second position to expose at least a portion of each substantially lighter central portion;
a pull cord joined at one end directly or indirectly to the axle bar and having a portion that extends outside of the deer hunting decoy, wherein tugging on the pull cord causes the axle to rotate; and
a decoy deer head removably attachable to the deer hunting decoy,
wherein the axle bar is a weldment with a V-shaped action bar and an opposing counter weight, said axle bar having its central portion within the central post, said axle bar extending through holes formed through the central portion and having a first end extending through the front face and to which the first tail flap is joined and having a second end extending through the rear face of the cover and to which the second tail flap is joined.

* * * * *